(No Model.)
M. R. GARCIA.
PROCESS OF RECOVERING TIN FROM TIN PLATE.
No. 480,920. Patented Aug. 16, 1892.
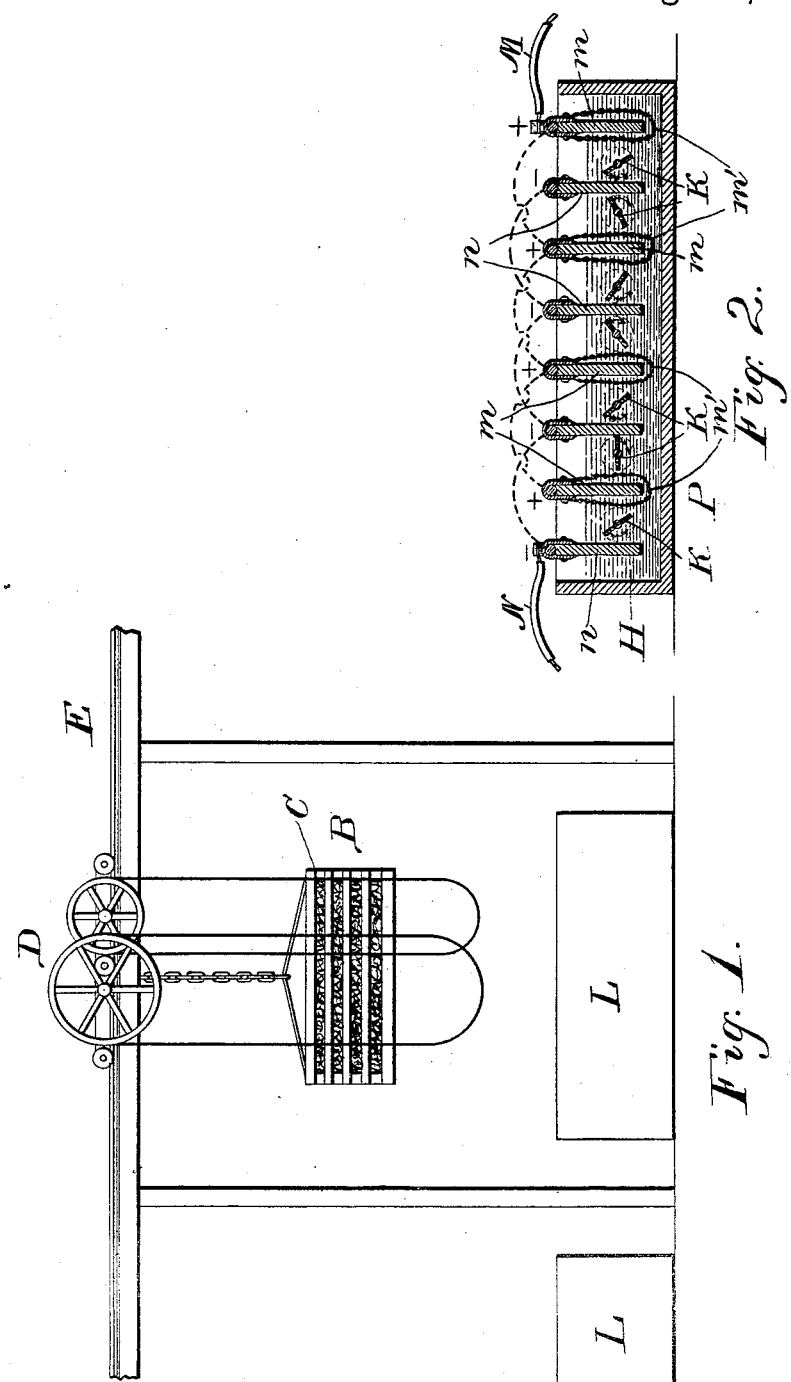
Witnesses
Percy C. Bowen
John C. Wilson
Inventor
Manuel Ramos Garcia,
By Whitman & Wilkinson,
Attorneys.

UNITED STATES PATENT OFFICE.

MANUEL RAMOS GARCIA, OF LONDON, ENGLAND.

PROCESS OF RECOVERING TIN FROM TIN-PLATE.

SPECIFICATION forming part of Letters Patent No. 480,920, dated August 16, 1892.

Application filed December 24, 1890. Serial No. 375,732. (No model.) Patented in England November 19, 1890, No. 18,726.

*To all whom it may concern:*

Be it known that I, MANUEL RAMOS GARCIA, a subject of the King of Spain, residing at London, England, have invented certain new and useful Improvements in Processes of Extracting Tin in Metallic State, (for which I have obtained Letters Patent in Great Britain, No. 18,726, dated November 19, 1890,) of which the following is a description.

In order to give a clear and comprehensible description of the series of successive operations for the extraction of tin from the cuttings of tin-plate, minerals, or scoriæ, and from all kinds of metal containing tin, I will describe the process in three different steps, viz: first, the chemical treatment to which the cuttings are subjected for cleaning them and removing the tin from the same; second, the electric treatment to which the liquids containing the tin in solution are subjected; third, the treatment of the iron when it is taken out of the baths.

Reference is had to the accompanying drawings, wherein the same parts are indicated by the same letters.

Figure 1 represents a side elevation of the elevated track with traveling truck carrying the crates of metal to be immersed and one of the immersion-vats. Fig. 2 represents a central longitudinal section of one of the electrolytical cells.

The first series of operations relates to the cleaning of and removing of the tin from the cuttings, the composition and maintenance of the tin-removing baths, and the industrial method for the conveyance and untinning of large quantities of cuttings.

The cuttings and waste of tin-plate may be divided in two classes. The first consists of the waste yielded by the manufactures and the second consists of the old cans for preserved articles and tin articles of household use. The first class, which consists of the cuttings and waste of new plates, is generally clean and can be treated in the tin-removing baths without any previous preparation. The second class which consists of old cans and household articles, is in an entirely different condition, such articles being greasy, oily, &c. In order to remove these impurities, which would be prejudicial to the tin-removing process and soil the baths, I place them in layers in a suitable furnace between layers of wood or shavings. The wood is then set fire to from the top, and the slow combustion burns off all particles of grease, &c., from the cans and melts the solder, which runs down in the hearth and is afterward collected. The ashes are dusted off the cans and they are then ready to be put into the baths without any further preparation.

In the accompanying drawings, the vats L, which are made of stone or other material inert to the action of the chemicals therein contained (preferably lava stone or well crystallized granite,) are partly filled with a solution of perchloride of iron, which dissolves the tin, but acts very feebly on iron. This perchloride of iron is prepared in any convenient way; but after the baths are a few days in use they will themselves perform the regeneration of the perchloride of iron.

As I will explain in the electric step of the process, the baths will become daily more charged with ferrous chloride, so that after some time the latter will crystallize.

The tanks which I use have a rectangular shape and a capacity of about three thousand five hundred liters. They are placed in two rows under tracks E, supporting overhead trucks D, provided with winches. From the chains of these winches are suspended skeleton cases B, made of pine coated with petroleum containing a little paraffine in solution. These cases, which have a prismatic shape, have about the inside dimensions of the tanks, so that they can be readily introduced in the same. Every case contains about two hundred and fifty kilograms of tin-plate cuttings C. The overhead trucks carry them above the tanks, and they are lowered into the same by means of the winches. The reaction is that the perchloride of iron becomes a protochloride of tin and iron. After two or three minutes the untinning process is completed, the winches raise the cases out of the liquid, and the movable bridges will convey them above other tanks, where they are submerged in order to wash the cuttings. After the washing of the cuttings they are conveyed by overhead trucks to a third series of tanks containing liquids, as to the composition of which I will refer later, and which have for their purpose to prevent oxidation of the iron.

The manipulations which I have described are rapidly performed and allow of the treatment of a large quantity of cuttings every day in a well-conducted establishment.

R and R' are tracts for transporting the material for the baths.

The second series of operations consists of the preparation of the liquid charged with tin, the arrangement of the electrolytical cells for the reduction, the care to be devoted, the process of reduction, and the electric apparatus of reduction and its use. When a sufficient amount of tin is passed into the baths, so that the liquids contain at least ten per cent. of their weight in tin, the liquid is filtered either through a layer of fine sand or through felt pockets or bags. I add to the liquid phenic acid in ordinary crystals at the rate of five hundred grams per one thousand kilograms of liquid and sulphuric acid of 66° Baumé at the rate of one thousand grams per one thousand kilograms of liquid. The phenic acid and sulphuric acid are added, the former in order to reduce polarization, the latter in order to increase the conductivity of the liquid when subject to the electric current. The liquids are then led into the electrolytical cells P. These cells consist of rectangular tanks of bituminated bricks partly filled with the liquids H, in which are submerged negative electrodes $n$ of lead and positive electrodes $m$ of iron. These electrodes are placed together and a woven fabric $m'$ of some kind is placed over the positive electrodes to prevent the possibility of the electrodes coming into contact and also to inclose any black peroxide of iron formed and dissolved during the reaction. M and N are the terminal wires.

The grouping and the surfaces of the electrodes must be calculated in accordance with the work to be done and vary with the requirement of the plant. The number, size, and grouping, and electric tension of the cells vary in the same proportions under similar circumstances.

As the chemical composition of the liquids used by me makes it unnecessary to pay any attention to the number of ampères passing per square decimeter of the electrode, it is easy by changing the surface of the latter to modify the resistance of the cell and to regulate it once for all for its work. During the passage of the current which reduces the tin in the cells it is merely necessary to take care that the particles of tin which are deposited on the negative electrode be removed by means of wooden stirrers K, so as to prevent these particles from bringing the negative electrode into short circuit with the positive electrode, notwithstanding the envelope of fabric covering the latter. This envelope or wrapper covers entirely the positive electrodes of the cells, which electrodes are dissolved in order to form ferrous chlorides. One result of the electrolytical action is that the baths will become daily more charged with the ferrous chloride, which will be deposited in crystals, and thus the baths will themselves perform the regeneration of the perchloride of iron. It must be mentioned here that these electrodes will form a little insoluble black peroxide of iron, which being mixed in the liquid would make it dim and impede the reduction of the tin. To avoid this drawback, I make use of the before-described filtering envelope or casing to the iron electrode, which material is preferably a cotton fabric previously parchmentized to prevent its speedy destruction by the chemicals.

The third series of operations consists of the collection of the tin after reduction, the preparation of the same before melting, and the protection of the iron against oxidation. When the liquids exposed to the action of the electric current do not contain more than four per cent. tin, I stop the electrolysis. The cells are emptied of the liquid contained therein and the tin collected at the bottom is removed. It is then carefully washed in ordinary water. In washing the deposited tin the water takes up the chloride of tin. This water is drawn off and fresh added until it is no longer white, which shows clearly that the tin is then cleansed of the chloride which adhered to it, and it is then washed in water mixed with sulphuric acid. It is then allowed to drain and is subsequently immersed in petroleum. The petroleum drives out the water remaining in the pores of the tin, and the product is then ready for melting. The untinned iron after being washed in water to cleanse it is immersed in a solution of lime, soda, or caustic potash, wherein it is covered with a slight alkaline coat, which protects it as much as possible against the oxidizing action of the damp air. It is then pressed in bundles and can be readily shipped.

In the above-described manner I have solved the question so long the subject of searchers—viz., the utilization of the cuttings and waste of tin-plate.

Having thus described my invention, what I claim, and desire to secure by Letters Patent of the United States, is—

1. The process of recovering tin from cuttings of tin-plate &c., the same consisting in first subjecting the cuttings and the like to a bath of perchloride of iron to remove the tin, then passing the liquid bath through any suitable filtering substance, then subjecting the same in a suitable apparatus to an electric current to reduce the tin, then subjecting the recovered tin to a suitable bath for washing, and finally drying the same, substantially as set forth.

2. The process of recovering the tin from old articles of tinware, the same comprising the following steps: first, subjecting said articles to the action of fire or heat to unsolder the parts and remove therefrom the grease, &c.; second, subjecting said articles to a bath of perchloride of iron to remove the tin; third, passing the liquid bath containing the tin through a filtering substance; fourth, subjecting the liquid bath to an electric current to reduce the tin, and, fifth, subjecting the recovered and reduced tin to a suitable bath to wash and dry the same, substantially as set forth.

Signed at Brussels, Belgium, this 5th day of November, A. D. 1890.

MANUEL RAMOS GARCIA.

Witnesses:
 J. B. DE VOS,
 A. CANOKE.